Jan. 31, 1950  F. F. KISHLINE  2,496,219
RESILIENT MOUNTING
Filed Sept. 14, 1948

FLOYD F. KISHLINE
INVENTOR.

BY Albert Latta
HIS ATTORNEY

Patented Jan. 31, 1950

2,496,219

UNITED STATES PATENT OFFICE 2,496,219

RESILIENT MOUNTING

Floyd F. Kishline, Kenosha, Wis., assignor to Nash-Kelvinator Corporation, Kenosha, Wis., a corporation of Maryland Application September 14, 1948, Serial No. 49,167

6 Claims. (Cl. 103—103)

This invention relates to a mounting for a rotating shaft and is particularly suitable for use in connection with a water pump assembly such as for automotive use.

It is one object of the invention to provide a resilient mounting which will permit self-alignment of the driven shaft relative to the driving shaft.

Another object of the invention is to provide a resilient mounting which insulates the driven shaft bearings and packings from engine vibration.

Another object of the invention is to provide a resilient mounting which permits a two-piece pump housing assembly, said resilient mounting serving as a seal between the two pieces which make up the pump housing assembly.

A further object of the invention is to provide a two-piece pump housing assembly which is simple to manufacture and which may be readily assembled in conjunction with the resilient mounting.

In the prior art the use of a rubber O ring to support a stationary cap relative to a stationary container has been known.

It has also been proposed to insert a ring of elastic material and of rounded cross section between two rotating members to form an elastic driving connection between said members.

In the automotive art it has been common practice to employ a water pump wherein the water pump shaft is driven by the generator shaft, said shafts being end to end and coupled together by means of a flexible sleeve connection. The water pump housing is formed of a single casting which is secured to the engine block and which casting is provided with a sleeve-like extension which serves as a bearing retainer for the pump shaft. This bearing retainer portion of the pump housing accommodates sleeve bearings and packing material, the bearings supporting the pump shaft and the packing material preventing escape of water from the pump chamber. In such a construction the pump shaft bearings and the packing material are continuously subjected to engine vibration due to the pump housing being secured to the engine block. In this type of construction machining tolerances must be quite closely maintained in order that the bearing retainer, bearings and the pump shaft would be in substantially longitudinal axial alignment with the axis of the generator shaft.

In the present invention by making the pump housing of a two-piece structure and interposing an elastic O ring between said pieces I am able to reduce the amount of vibration to which the bearings and bearing retainer are subjected and in addition thereto I provide a seal to prevent escape of water from the pump chamber, and still further, I provide an elastic mounting for the bearing retainer which permits self-alignment of the pump shaft with the generator shaft thereby substantially eliminating the necessity of holding close machining tolerances.

Other objects of my invention will be apparent in the following specification and in the accompanying drawings, in which.

Figure 1:
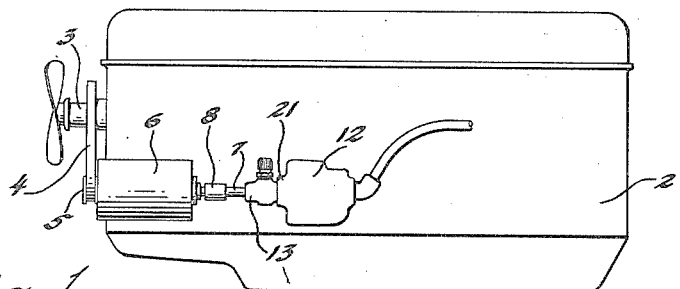
Figure 1 is a side elevation showing my invention as employed in a water pump for use with an automobile engine.
Figure 2:
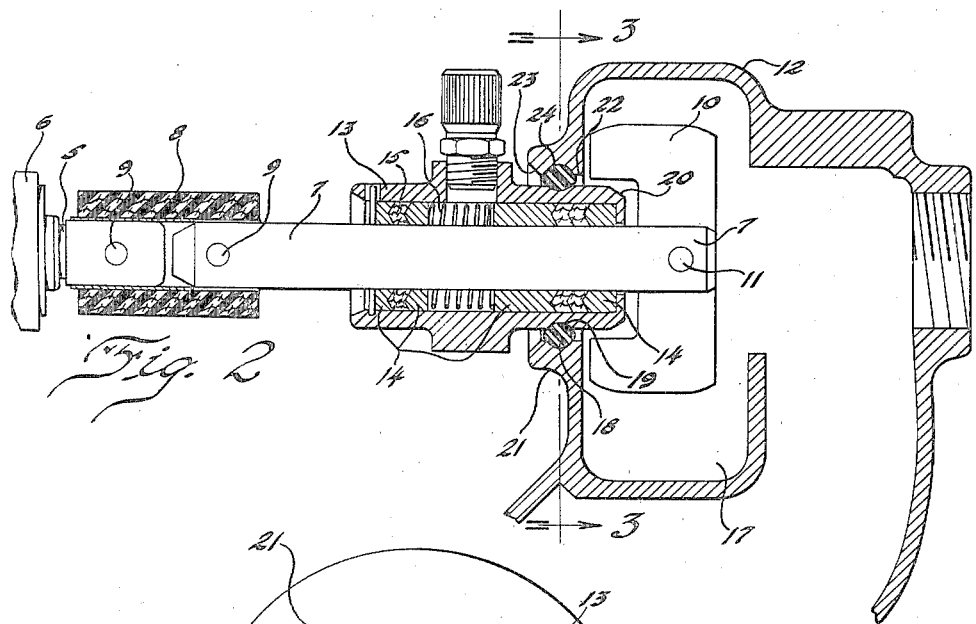
Figure 2 is a sectional view showing my invention as used with a water pump assembly.
Figure 3:
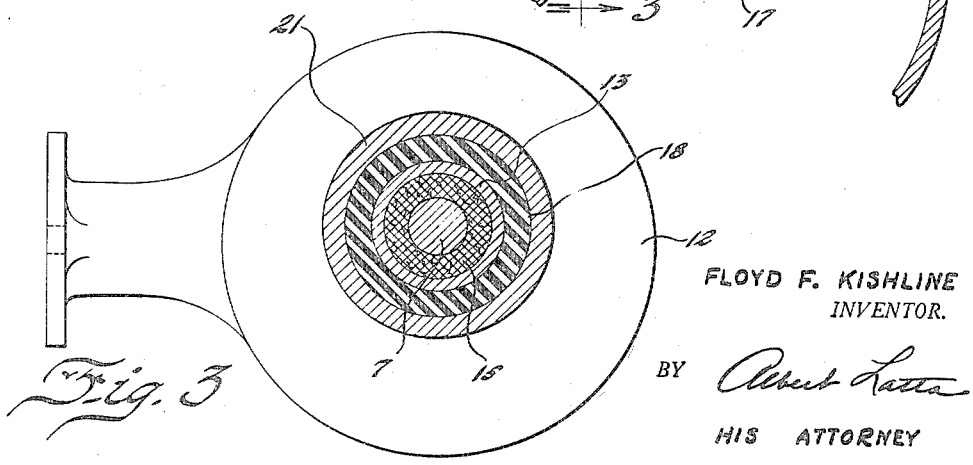
Figure 3 is a sectional view taken on line 3—3 of Figure 2.

I have shown one embodiment of my invention as it may be used with a water pump on an automobile engine. The engine 2 drives the conventional fanshaft 3 which in turn through V-belt 4 drives generator shaft 5 of generator 6. The generator shaft 5 is coupled to water pump shaft 7 through the medium of a flexible sleeve 8 which may be secured to each shaft by means of pins 9. An impeller 10 is secured to the free end of pump shaft 7 by means of a pin 11. The water pump housing comprises a pump chamber casting 12 and bearing retainer sleeve 13. Sleeve bearings 14 support pump shaft 7 relative to bearing retainer 13. Packing material 15 compressed by spring 16 prevents water from escaping out of pump chamber 17 along shaft 7. The bearing retainer 13 is supported relative to pump housing 12 through the medium of an elastic rubber-like O ring 18 which is interposed between bearing retainer sleeve 13 and pump housing 12. Sleeve 13 is provided with an annular groove 19 and is beveled at 20. The pump housing 12 has a flange portion 21 to accommodate a cylindrical opening 22. Flange portion 21 is countersunk at 23 and is provided with an annular groove 24. When it is desired to assemble sleeve 13 relative to housing 12, the elastic O ring 18 is positioned on the beveled portion 20 of sleeve 13 against the countersunk portion 23 of housing 12. As pressure is applied at the outer end of sleeve 13 the elastic ring 18 is compressed and rides along with sleeve 13 until it reaches annular groove 24 where it remains until sleeve 13 is moved inwardly far enough to permit the ring 18 to slip into the annular groove 19, whereupon the assembly of sleeve 13 relative to housing 12 is completed. When the elastic ring 18 comes at rest in grooves 19 and 24 it is still in a compressed condition thereby effectively sealing off pump chamber 17. The elastic ring 18 provides the sole support mounting between housing 12 and sleeve 13. It can thus be seen that the use of a single elastic ring permits the pump housing to be made of two separate pieces whereby the sleeve 13 is insulated from engine vibration, thereby reducing wear and tear on bearings 14 and packing material 15. This same elastic ring 18 permits self-alignment of the pump shaft 7 longitudinally with respect to the axis of generator shaft 5.

Having thus described my invention, what I claim is:

1. In combination with a pump having a driving shaft, a driven shaft, a flexible coupling between the driving and driven shafts, an impeller and a pump housing having a mouth; a shaft supporting sleeve telescoped into the mouth of the pump housing in substantial axial alignment with the drive and driven shafts, a rubber-like ring interposed between the sleeve and housing and serving to seal off the mouth of the housing and to yieldably support the sleeve within the housing, said rubber-like ring being spaced from the flexible coupling a substantial distance and being in a permanently compressed condition whereby to lend adequate supporting rigidity to the sleeve so that the sleeve functions as a stationary bearing retainer for the rotative driven shaft.

2. In combination with a pump having a driving shaft, a driven shaft, a flexible coupling between the driving and driven shafts, an impeller and a pump housing having a mouth; a sleeve embracing the driven shaft and protruding into the mouth of the housing in substantial axial alignment with the drive and driven shafts, the exterior surface of said sleeve having an annular groove, an annular groove in the housing at the mouth thereof, a rubber-like ring interposed between the housing and sleeve within the annular grooves, said rubber-like ring being spaced from the flexible coupling a substantial distance and being in a permanently compressed condition whereby to lend adequate supporting rigidity to the sleeve so that the sleeve functions as a stationary bearing retainer for the rotative driven shaft.

3. A pump mounting as set forth in claim 2 wherein the mouth of the housing is countersunk and the end of the sleeve is bevelled to facilitate assembly of the rubber-like ring into the annular grooves.

4. In combination with a pump assembly having a drive shaft, a driven shaft, an impeller and a flexible coupling between the driving and driven shafts; a pump housing with a chamber accommodating the impeller, one face of the housing having an open mouth, a bearing retainer for the driven shaft in substantial axial alignment with the drive and driven shafts, said bearing retainer being separate from the housing and extending into the mouth of the housing and a rubber-like ring interposed between the housing and the bearing retainer whereby to seal the pump chamber and to support the bearing retainer relative to the housing, said rubber-like ring being spaced from the flexible coupling a substantial distance and being in a permanently compressed condition whereby to lend adequate supporting rigidity to the bearing retainer so that the bearing retainer functions as a stationary supporting means for the rotative driven shaft.

5. In combination with a pump assembly having a drive shaft, a driven shaft, an impeller and a flexible coupling between the driving and driven shafts; a pump housing with a chamber accommodating the impeller, one face of the housing having a mouth, a bearing retainer for the driven shaft in substantial axial alignment with the drive and driven shafts, said bearing retainer extending into the mouth of the housing and having its external surface spaced from the wall defining the mouth of the housing, a compressible member interposed between the bearing retainer and the housing, said compressible member being spaced from the flexible coupling a substantial distance and being in a permanently compressed condition whereby to lend adequate supporting rigidity to the bearing retainer so that the bearing retainer functions as a stationary supporting means for the rotative driven shaft.

6. In combination with a pump assembly having a drive shaft, a driven shaft, an impeller and a flexible coupling between the driving and driven shafts; a pump housing with a chamber accommodating the impeller, one face of the housing having a mouth, a bearing retainer for the driven shaft in substantial axial alignment with the drive and driven shafts, said bearing retainer extending into the mouth of the housing and having its external surface spaced from the wall defining the mouth of the housing, a rubber-like compressible ring interposed between the bearing retainer and the housing, said compressible member being spaced from the flexible coupling a substantial distance and being in a permanently compressed condition whereby to lend adequate supporting rigidity to the bearing retainer so that the bearing retainer functions as a stationary supporting means for the rotative driven shaft.

FLOYD F. KISHLINE.

REFERENCES CITED

The following references are of record in the file of this patent:

UNITED STATES PATENTS

| Number | Name | Date |
|---|---|---|
| 475,311 | Hart | May 24, 1892 |
| 2,116,099 | Chamberlain | May 8, 1938 |

FOREIGN PATENTS

| Number | Country | Date |
|---|---|---|
| 543,733 | Great Britain | Mar. 10, 1942 |